G. Whitcomb

Horse-Rake

No. 2995 Reissued Jun. 16, 1868.

Witnesses:

William C. Slater

Daniel D. Denning

Inventor

Geo. Whitcomb

United States Patent Office.

GEORGE WHITCOMB, OF PORTCHESTER, NEW YORK.

*Letters Patent No.* 21,712, *dated October* 5, 1858; *reissue No.* 2,995, *dated June* 16, 1868.

IMPROVEMENT IN HORSE-RAKES.

The Schedule referred to in these Letters Patent and making part of the same.

TO ALL WHOM IT MAY CONCERN:

Be it known that I, GEORGE WHITCOMB, of Portchester, in the county of Westchester, and State of New York, have invented a new and improved Horse-Rake; and I do hereby declare that the following is a full, clear, and exact description of the same, reference being had to the annexed drawings, making a part of this specification, in which—

Figure 2:
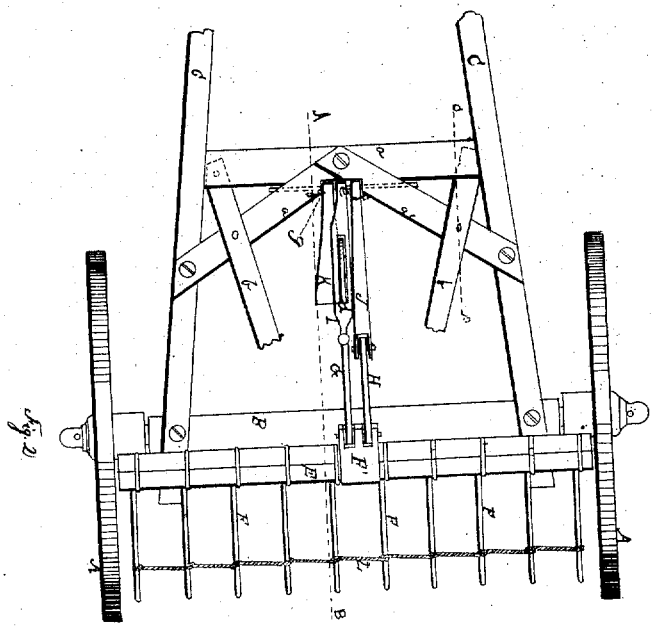
Figure 2 represents a plan or top view of the rake, without the seat, the shafts and seat-supports being shown broken off.
Figure 3:
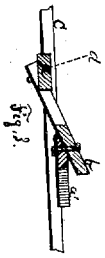
Figure 3 represents a section, on line C D, to illustrate the mode of supporting the lower ends of the seat-supports.

To enable those skilled in the art to which my invention belongs to make and use the same, I will proceed to describe it more in d.

In the drawings, A A are the main supporting and carrying-wheels, fitted to turn upon the ends of the axle B, to which the rear ends of the shafts or thills C C are securely attached. The thills or shafts C C are connected and braced in front of the axle, as shown at *a a′ a′*.

The driver's seat D is supported by two spring-arms, *b*, one on each side. The lower points of the arms *b* pass down over the angular braces *a′ a′*, and under the cross-brace *a*, whereby a secure attachment is obtained for the spring-arms, to the rear upper ends of which the seat D is attached.

The rear ends of the thills or shafts extend back on the axle B, sufficiently far to enable the rake-head E to be hinged thereto, by an eye-bolt or hinge-connection, *c*, one to each shaft; the hinges *c* being under the head E, as indicated in the drawings.

The rake-head E is parallel with the axle B, and is provided with a series of wire teeth, F, said teeth being coiled once or twice around the head to give a certain degree of elasticity to them. The teeth are coiled in grooves or gains cut in the corners of the head E, for retaining the teeth in proper position, or from too much lateral play, (see fig. 2.)

A bar or arm, F′, is attached to the back of the head E, so as to project up at right angles with the head, as indicated in the drawings. To the upper end of bar or arm F are hinged or pivoted the rear ends of the arms G and H. The front end of arm G is pivoted or hinged to the hand-lever I, which, in this instance, is slotted out to receive the lever G, as shown at *d*, while its lower end is hinged or pivoted to the front ends of the braces *a′ a′*, as shown at *e*. The lower end of arm H is hinged or pivoted to the rear and lower end of the foot-treadle J, the front end of which treadle J being hinged or pivoted to the angle-braces *a′ a′*, as shown at *f*.

Figure 1:
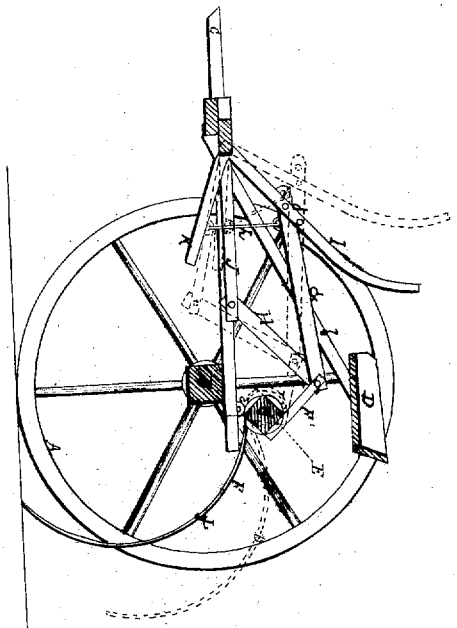
Figure 1 represents a side sectional elevation of a horse-rake, constructed according to my invention, the line of section being indicated by line A B, fig. 2, the shaft being shown broken away.

Another foot-treadle, K, is hinged or pivoted to the angle-braces *a′ a′*, as shown at *g*, and the rear inner part of the foot-treadle K is connected to the front part or end of arm G by a link or rod, *h*, (see fig. 1.)

L is a rope, which is fitted on the teeth F, the rope being either looped around the teeth or the teeth passed between its strands, so that the rope may be raised or lowered on the teeth, as may be desired, to adjust it to the proper position upon the teeth, to prevent the hay from working up and back upon the teeth, so far as to interfere with a free and perfect discharge thereof.

It will be observed that the hay-guard L is combined with each tooth, and that while it rises and falls with the teeth, when the head is rocked, it at the same time will allow each tooth to rise above or fall below the horizontal plane in which the ends of the other teeth are moving.

Then, again, while the rope guard tends to keep all of the teeth in their proper relative lateral positions, and thus prevents any two of the teeth separating, so as to leave wide and open spaces for the escape of hay, should any one of the teeth strike against an obstruction, presenting an inclined surface to the tooth coming in contact with such obstruction, the teeth on one side of such tooth will all spring laterally to let the tooth striking the obstruction pass, slide, or spring by the same.

My hay-guard L, therefore, is very important in a spring-tooth horse-rake. It can be easily adjusted up or down upon the teeth, while at the same time it is so combined with the teeth as not to cramp or bind them injuriously, when the rake is in operation.

This last feature in a wire-tooth horse-rake is very essential, to guard against the breaking or undue bending of the teeth when the rake is used on rough and uneven ground.

As the wheels of a horse-rake are necessarily of considerable size, equalling, if not exceeding, the front wheels of a common carriage, the driver's seat is quite elevated, and to guard against the seat having too much lateral spring, the arms *b b* in my rake are extended down, forward and outward, from the seat, their lower ends being passed over the rear cross-pieces *a′ a′* and under the cross-piece *a*, in which position they are fastened.

It will be seen that by the above arrangement the seat is braced laterally in a very strong manner, while at the same time being so supported on the upper ends of the arms *b b* as to have an easy vertical spring-motion on said arms.

The seat-supports *b b*, diverging at the lower ends, as shown in fig. 2, leave ample room for the driver to rest his feet, when desirable, against the rear cross-braces *a′ a′*, which latter braces perform the functions of bracing the thills or shafts, back-supports for the lever-arms *b b*, and foot-supports for the driver, in addition to supporting the pivot or journal of the treadle and lever-arrangements.

The relative arrangement of the main axle, rake-head, rake-teeth, hay-guard, and carrying-wheels is such as to produce a compact, strong, and very effective horse-rake.

Having described one practical and good way of applying that part of my invention in horse-rakes, which forms the subject-matter of this patent—

What I claim therein as new, and of my invention, and desire to secure by Letters Patent, is—

1. The combination, with the teeth, of an adjustable hay-guard, L, or equivalent device, substantially as and for the purposes set forth.

2. The combination, with the teeth of a horse hay-rake, of a hay-guard, which moves with the teeth when the head is raised or lowered, but which permits each tooth to rise and fall to a certain extent, independent of the others, while all the teeth are held from springing laterally from each other, thereby preventing wide, open, and increased spaces between any two teeth, for the escape of hay while the rake is in operation.

3. The arrangement of the upwardly and inwardly-inclined seat-supports *b b*, with the cross-piece *a* and angular braces *a′ a′*, substantially as and for the purposes described.

GEO. WHITCOMB.

Witnesses:

WILLIAM G. SLATER,

DANIEL D. DUNN.